United States Patent [19]
Norimatsu

[11] Patent Number: 5,701,603
[45] Date of Patent: Dec. 23, 1997

[54] RADIO APPARATUS HAVING A PLURALITY OF ANTENNAS

[75] Inventor: Hidehiko Norimatsu, Tokyo, Japan

[73] Assignee: NEC Corporation, Tokyo, Japan

[21] Appl. No.: 428,051

[22] Filed: Apr. 25, 1995

[30] Foreign Application Priority Data

Apr. 28, 1994 [JP] Japan .................. 6-111674

[51] Int. Cl.$^6$ .................................. H04B 1/18
[52] U.S. Cl. ............... 455/277.1; 455/282; 343/876
[58] Field of Search ............... 455/277.1, 277.2, 455/269, 271, 272, 282; 343/876, 793, 858, 833, 834; H01Q 1/50, 3/24

[56] References Cited

U.S. PATENT DOCUMENTS

| | | | |
|---|---|---|---|
| 3,656,167 | 4/1972 | Leg | 343/793 |
| 3,996,592 | 12/1976 | Kline et al. | 455/277.1 |
| 5,440,590 | 8/1995 | Birchler et al. | 455/277.2 |

FOREIGN PATENT DOCUMENTS

| | | |
|---|---|---|
| 58-113771 | 7/1983 | Japan . |
| 58-186066 | 10/1983 | Japan . |
| 59-81143 | 6/1984 | Japan . |
| 2190006 | 7/1990 | Japan . |

OTHER PUBLICATIONS

The AARL Antenna Book, 1988, p. 2–2.
Patent Abstracts of Japan, vol. 7, No. 220 (P–226), Sep. 30, 1983 & JP–A–58 113771, Jul. 6, 1983.
Patent Abstracts of Japan, vol. 18, No. 069 (E–1502), Feb. 4, 1994 & JP–A–05 284060, Oct. 29, 1993.

*Primary Examiner*—Reinhard J. Eisenzopf
*Assistant Examiner*—Philip J. Sobutka
*Attorney, Agent, or Firm*—Scully, Scott, Murphy & Presser

[57] ABSTRACT

A radio apparatus according to the present invention comprises a plurality of antennas to be selectively connected to a radio circuit, switches capable of grounding a maximum point in the current distribution of a standing wave of each antenna, and a circuit for operating a switch of a non-selected antenna of these antennas to be grounded. The present invention also includes an antenna switching circuit for synchronizing each switch to selectively perform switching operation. In such an arrangement, one of a plurality of antennas is selected to be connected to the radio circuit, and an intermediate terminal of the selected antenna is opened to obtain a predetermined current distribution of a standing wave, thereby assuring the normal communication operation. Meanwhile, a point having a maximum value of the current distribution of a standing wave of one or more non-selected antennas is grounded to collapse the impedance thereof, and these antennas are prevented from interfering with the selected antenna, avoiding the affection of these antennas to the selected antenna.

6 Claims, 2 Drawing Sheets

RADIO APPARATUS HAVING A PLURALITY OF ANTENNAS

BACKGROUND OF THE INVENTION

1. Field of the Invention

The present invention relates to a radio apparatus having a plurality of antennas, and more particularly to a radio apparatus for selecting and switching a plurality of antennas to be used.

2. Description of the Related Art

A mobile radio apparatus like a recent movable telephone or a portable telephone is provided with a plurality of antennas which are selectively connected to a transceiver in response to a frequency or the like at a position to which the radio apparatus is moved. In such a radio apparatus, however, when each antenna is adjacent to each other, the both antennas interfere with each other, and a non-selected antenna affects a selected antenna, inhibiting a preferable communication.

Therefore, a countermeasure for avoiding the interference by the non-selected antenna has been taken. For example, Japanese patent laid-open publication No. 58-113771 discloses a configuration for preventing the interference with the selected antenna by opening a feeder portion of the non-selected antenna. Further, Japanese patent laid-open publication No. 58-186066 discloses a structure for avoiding the interference by the non-selected antenna by grounding the feeder potion thereof. Moreover, Japanese patent laid-open publication No. 59-81143 disclose an arrangement, in which two feeder portions can be selected with respect to one antenna and the interference is prevented by grounding a non-selected feeder portion.

With these conventional arrangements, however, the bandwidth of the non-selected antenna can not be sufficiently shifted by only opening or grounding the feeder portion thereof in the radio apparatus adopting 1/2 whip antennas or plate antennas having a wide bandwidth as its antennas, the interference with the selected antenna is not hence sufficiently avoided.

SUMMARY OF THE INVENTION

It is therefore an object of the present invention to provide a radio apparatus having a plurality of antennas being capable of preventing one antenna selected from a plurality of antennas from being interfered by the other non-selected antenna.

It is another object of the present invention to provide a radio apparatus being capable of avoiding the mutual interference of a plurality of antennas even when a plurality of antennas have a wideband property, respectively.

It is still another object of the present invention to provide a radio apparatus being capable of automatically switching to any preferable antenna from a plurality of antennas in accordance with the communication state.

A radio apparatus according to the present invention is provided with a plurality of antennas to be selectively connected to a radio circuit and switches each of which can ground a maximum point in the current distribution of the standing wave of each antenna. In addition, the radio apparatus is provided with a circuit for operating a switch of a non-selected antenna from these antennas to ground the non-selected antenna.

For example, a plurality of antennas may be constituted by 1/2 whip antennas, and an intermediate terminal is provided at an intermediate position of the antenna length with which the current distribution of its standing wave becomes maximum. The switch is connected to the intermediate terminal, and the intermediate terminal is grounded by driving this switch.

Further, according to the present invention, the radio apparatus may be provided with an antenna switching circuit for synchronizing each switch and allowing it to selectively operate for switching. This antenna switching circuit may preferably be constituted in such a manner that the antenna switching operation can be carried out on the basis of signals related to the communication states output from the radio circuit.

The normal communication operation is assured by selecting one from a plurality of antennas to be connected to the radio circuit and opening the intermediate terminal of the selected antenna to obtain a predetermined current distribution of the standing wave. On the other hand, each impedance of one or more non-selected antennas is greatly collapsed by grounding any point having a maximum value of the current distribution of their standing wave, and the mutual interference between these non-selected antennas and the selected antenna, thereby preventing the non-selected antennas from affecting the selected antenna.

Further, when a plurality of antennas are constituted by the 1/2 whip antennas, an intermediate terminal is provided at an intermediate position of the antenna length with which the current distribution of their standing wave becomes maximum, a switch is connected to the respective intermediate terminal, and this switch is driven to ground the intermediate terminal, the impedance of the non-selected antenna is thus greatly collapsed, avoiding the affection to the selected antenna.

When the switches individually provided to a plurality of the antennas are synchronized by the antenna switching circuit to selectively perform the switching operation, and the antenna switching circuit selectively carries out the antenna switching operation on the basis of signals related to the communication states output from the radio circuit, and hence the preferable communication state can be always secured and the mutual interference between the antennas can be prevented involved therewith.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENT

Figure 1:
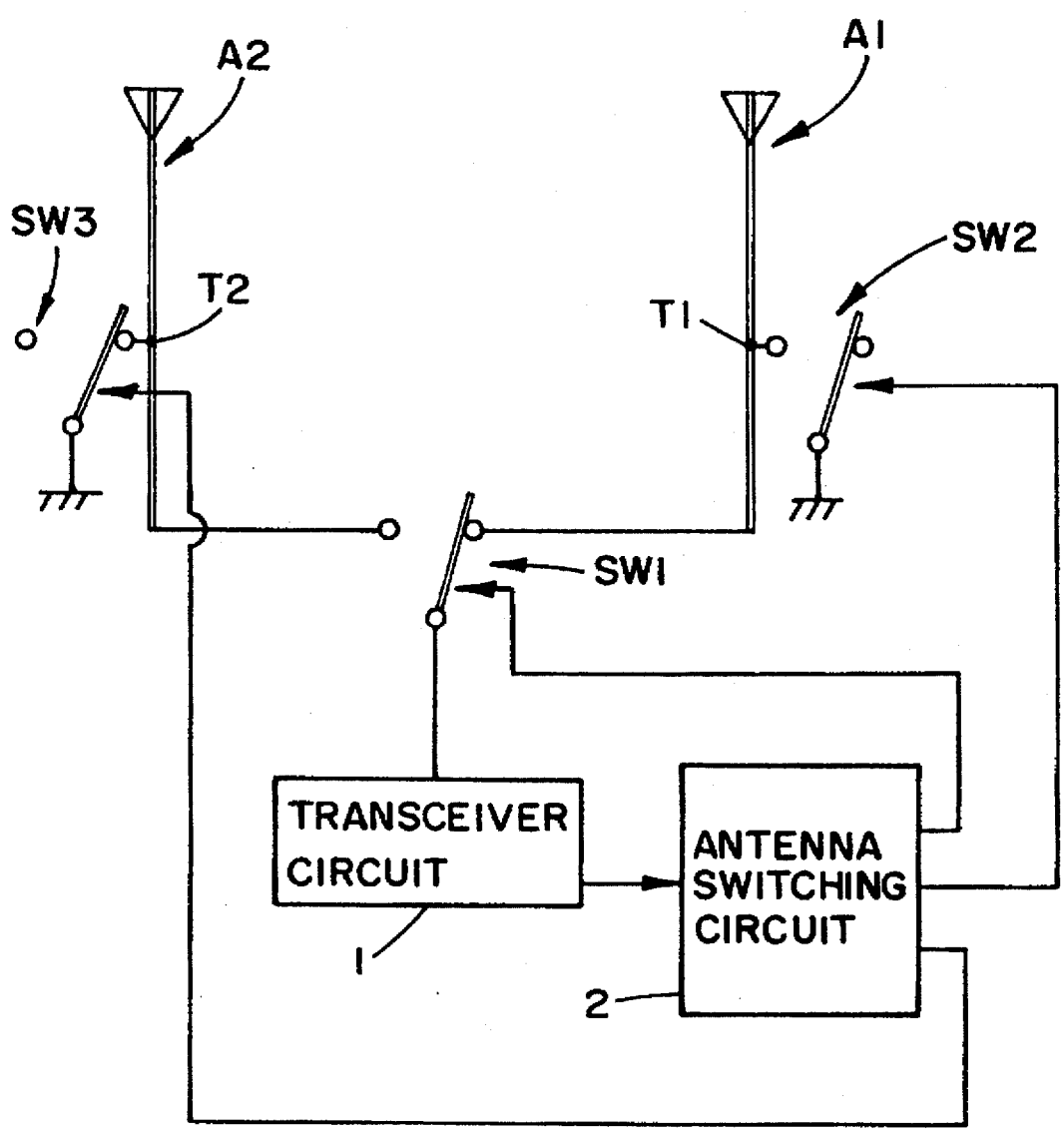
FIG. 1 is a block diagram showing an embodiment according to the present invention.

FIG. 1 is a block diagram showing a primary part of an embodiment according to the present invention. This embodiment illustrates an exemplary mobile communication apparatus to which the present invention is applied.

In FIG. 1, two antennas, i.e., a first antenna A1 and a second antenna A2 having frequency bandwidths different from each other are provided in the communication apparatus. It is assumed that these antennas A1 and A2 are constituted by 1/2 whip antennas. The antennas A1 and A2 are selectively connected to a transceiver circuit 1 by means of a first change-over switch SW1 which operates by turning of the electricity at a non-illustrated solenoid coil or the like. As to the configuration of other circuits to be connected to the transceiver circuit 1, its explanation will be omitted. Further, although a matching circuit for impedance conversion is required in this type of whip antenna, the description thereof will also be omitted.

An intermediate terminal T1 is provided at an intermediate position of the first antenna A1 in the length direction thereof, and a second change-over switch SW2 is connected to the intermediate terminal T1. One of a pair of selected terminals of the second change-over switch SW2 is connected to the intermediate terminal T1, and the other is grounded. Similarly, an intermediate terminal T2 is provided at an intermediate position of the second antenna A2 in the length direction thereof, and a third change-over switch SW3 is connected to the intermediate terminal T2. One of a pair of selected terminal of the third change-over switch SW3 is connected to the intermediate terminal T2, and the other is grounded. The second and third change-over switches SW2 and SW3 are designed to operate by turning of the electricity at non-illustrated solenoid coils or the like, in the same manner as the first change-over switch SW1.

The first to third change-over switches SW1 to SW3 are so configured as to concurrently perform the switching operation by a switching signal from an antenna switching circuit 2. In the normal state, each of the change-over switches SW1 to SW3 is switched to the position indicated by the solid line in the drawing.

The antenna change-over circuit 2 receives a signal from the transceiver circuit 1 and produces a switching signal for driving the first to third change-over switches SW1 to SW3 in response to the received signal.

Figure 2:
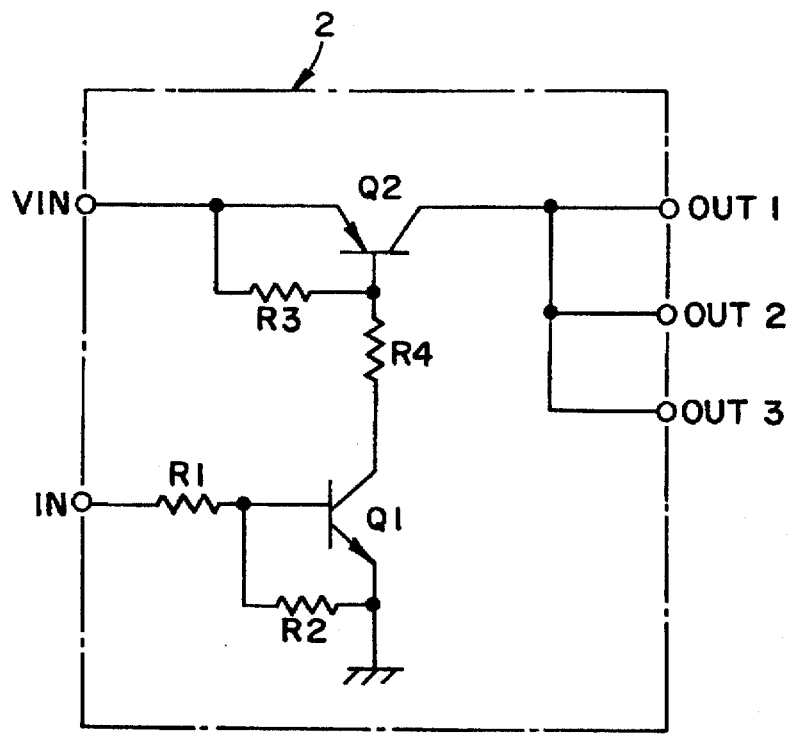
FIG. 2 is a circuit diagram showing an example of an antenna circuit.

FIG. 2 shows the antenna switching circuit. In this drawing, a terminal IN receives signals from the transceiver circuit 1. A terminal VIN receives a voltage required for operating switches by exciting the respective solenoids of the first to third change-over switches SW1 to SW3. Terminals OUT1 to OUT3 are output terminals for outputting switching signals to the first to third change-over switches SW1 to SW3, respectively.

Further, the signal receiving terminal IN is connected to a switch circuit including resistors R1 and R2 and a transistor Q1. Moreover, to the voltage input terminal VIN is connected a switch circuit constituted by resistors R3 and R4 and a transistor Q2. A collector of the transistor Q1 is connected to a base of the transistor Q2 through a resistor R4, and a collector of the transistor Q2 is commonly connected to the output terminals OUT1 to OUT3.

For the signal to the signal input terminal IN, a voltage which varies in accordance with the receiving state in the transceiver 1, e.g., an AGC voltage or any other voltage relating thereto is used.

Figure 3:
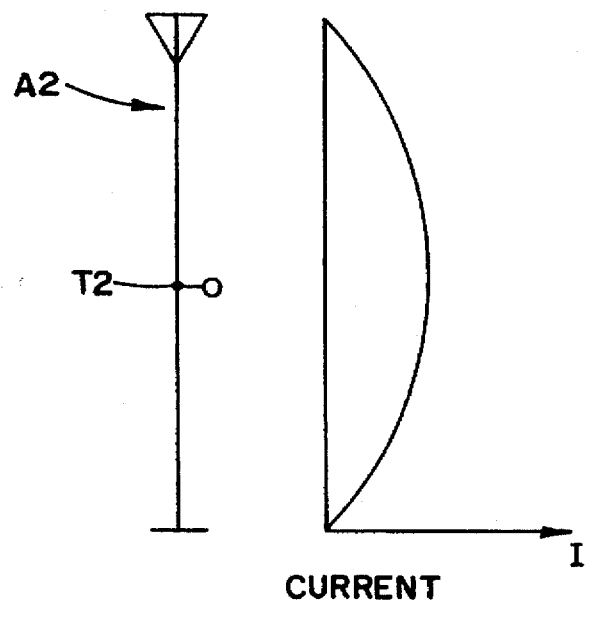
FIG. 3 is a view showing the current distribution of the standing wave in a 1/2 whip antenna.

According to this structure, as shown in FIG. 1, the first change-over switch SW1 selects the first antenna A1 in the initial state, and the transceiver circuit 1 is connected to the first antenna A1 to transmit or receive radio signals. At this time, the second change-over switch SW2 opens the intermediate terminal T1 of the first antenna A1. Meanwhile, the third change-over switch SW3 grounds the intermediate terminal T2 of the second antenna A2. In this state, when the intermediate terminal T2 of the second antenna A2 is grounded, since a point where the maximum current distribution is obtained is grounded as shown in FIG. 3 showing the current distribution of the standing wave of the second antenna A2, the impedance in the bandwidth which the second antenna A2 holds is largely collapsed. Consequently, even when the second antenna A2 is located in the vicinity of the first antenna A1, the interference between the first antenna A1 and the second antenna A2 is prevented, avoiding the affection to the first antenna A1.

On the other hand, when the deterioration of the communication state in the transceiver circuit 1 involves the need for switching from the first antenna A1 to the second antenna A2, the signal voltage output from the transceiver circuit 1 increases and a high voltage signal is supplied to the signal input terminal IN of the antenna switching circuit 2. Upon receiving this high voltage signal, the transistor Q1 is turned on, and hence the collector potential becomes the ground potential. The transistor Q2 is then turned on, and the voltage to the input terminal VIN is thus supplied to the output terminals OUT1 to OUT3 directly. Subsequently, each voltage to be output is supplied to the respective first to third change-over switches SW1 to SW3, exciting the solenoid or others to perform the switching operation at each change-over switch.

As a result, the transceiver circuit 1 is connected to the second antenna A2 by the first change-over switch SW1, and the transmission or reception using the second antenna A2 is thereafter carried out. At the same time, the third change-over switch SW3 opens the intermediate terminal T2 of the second antenna A2, thereby being operated with the necessary impedance. On the other hand, the second change-over switch SW2 grounds the intermediate terminal T1 of the first antenna A1 to greatly collapse the impedance in the bandwidth of the first antenna A1, thus preventing the interference with respect to the second antenna A2.

In this embodiment, therefore, even when either of the first antenna A1 and the second antenna A2 is selected to be used, since the maximum point of the current of the standing wave of the non-selected other antenna is grounded, the interference with respect to the selected antenna is avoided with the collapse of the impedance of the non-selected antenna. Thus, in a radio apparatus to be widely used as a mobile communication apparatus provided with a plurality of antennas whose bandwidths are relatively large such as 1/2 whip antennas, affection due to the non-selected antennas can be avoided, enabling the assurance of the preferred communication.

Further, in this embodiment, since the antennas are switched on the basis of the signals related to the communication state output from the transceiver circuit 1, any appropriate antenna is automatically selected in accordance with the communication state, and the manual switching operation by a user of the communication apparatus becomes unnecessary. Of course, it is possible to configure the present invention in such a manner that the antennas are switched by manual operation.

In addition, the present invention can be similarly applied to an example where three or more antennas are provided and these are selectively switched. In such a case, any one of three or more antennas can be selected to be connected the transceiver circuit by applying the configuration of the antenna switching circuit shown in FIG. 2, and the intermediate terminal of an antenna selected at that time may be opened while a plurality of non-selected other antennas may be grounded.

Moreover, although the present invention is applied to the radio apparatus having 1/2 whip antennas in this embodiment, the present invention can be applied to a radio apparatus employing antennas of any other system in the similar manner as the above embodiment by realizing the construction in which the change-over switches are connected in such a way that a maximum point in the current distribution of the standing wave of each antenna is grounded.

What is claimed is:

1. A radio apparatus which is provided with a plurality of antennas and which selects one of these antennas to be connected to a radio circuit, comprising:

a plurality of switch means each of which is provided to said respective antennas and is capable of grounding a maximum point in a current distribution of a standing wave of each of said antennas; and means for operating a first switch means of a non-selected antenna to ground said non-selected antenna without grounding said one of these antennas which is connected to said radio circuit, said first switch means being one of said plurality of switch means.

2. A radio apparatus having a plurality of antennas according to claim 1, wherein a plurality of said antennas are 1/2 whip antennas.

3. A radio apparatus having a plurality of antennas according to claim 2 further comprising: N (N is an integer larger than 2) antennas; one switch for selectively connecting one of said N antennas to a radio circuit; N switches being capable of selectively grounding each intermediate terminal of said N antennas; and an antenna switching circuit for synchronously switching among said N+1 switches.

4. A radio apparatus having a plurality of antennas according to claim 3, wherein said antenna switching circuit performs antenna switching operation in accordance with signals related to the communication state from the radio circuit.

5. A radio communication apparatus comprising:

a transceiver circuit;

a plurality of antennas to be selectively connected to said transceiver circuit;

means for selectively grounding said plurality of antennas; and a control circuit for selectively connecting one of said plurality of antennas to said transceiver circuit and selectively grounding other of said plurality of antennas without grounding said one antenna which is connected to said transceiver circuit;

said grounding means grounding a maximum point in a current distribution of a standing wave of each of said plurality of antennas.

6. A radio communication apparatus according to claim 5, wherein said grounding means grounds an intermediate position of each of said plurality of antenna.

* * * * *